UNITED STATES PATENT OFFICE.

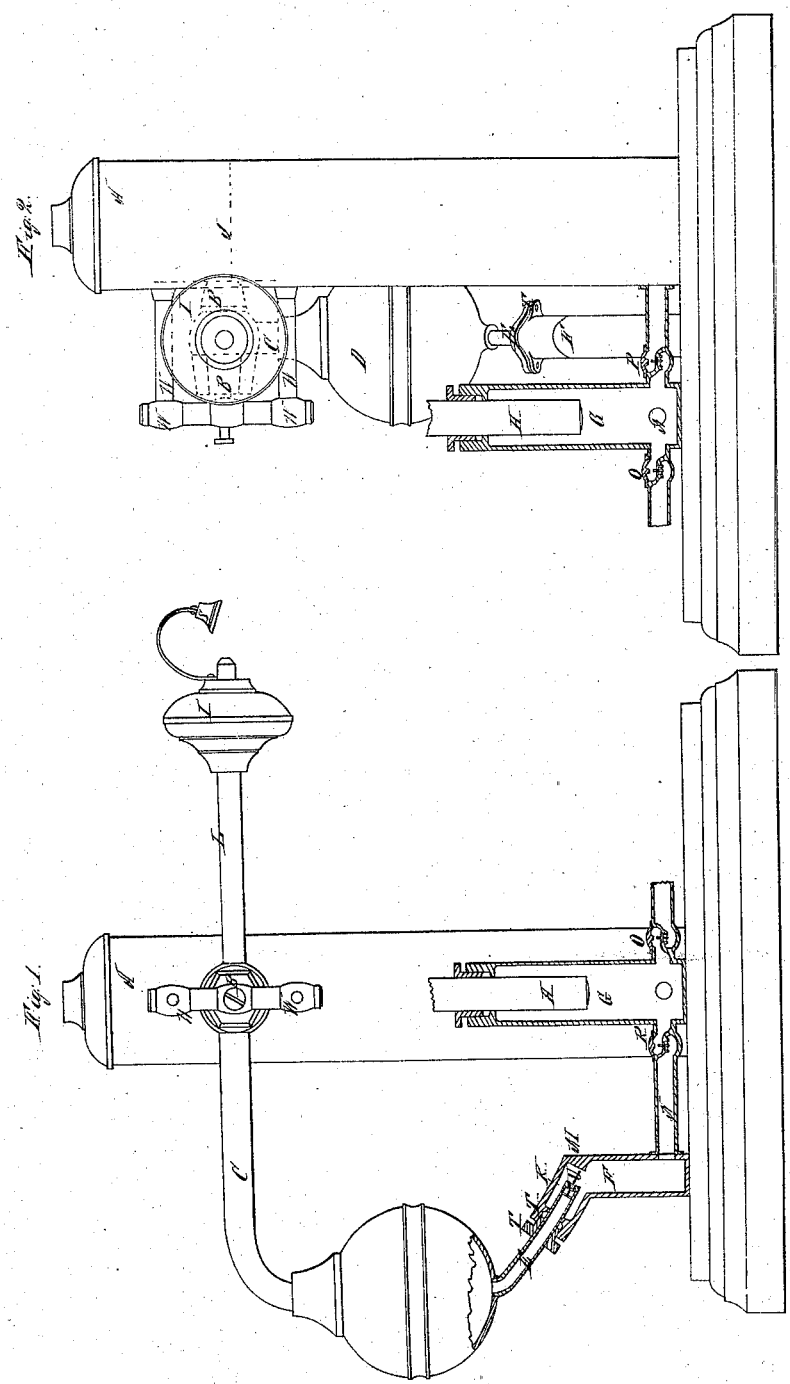

AMOS JACOBS, OF ITHACA, NEW YORK.

APPARATUS FOR REGULATING THE SUPPLY OF FEED-WATER TO STEAM-BOILERS.

Specification of Letters Patent No. 10,963, dated May 23, 1854.

*To all whom it may concern:*

Be it known that I, AMOS JACOBS, of Ithaca, in the county of Tompkins and State of New York, have invented a new and useful machine for the purpose of regulating the supply and determining the height of water in steam - boilers, thereby securing greater safety to human life and property, called an "indicating self-acting water-gage;" and I do hereby declare that the following is a full, clear, and exact description of the construction and operation of the same, reference being had to the annexed drawings, making a part of this specification, in which the machine is represented in two sectional figures—1 and 2—as follows:

A represents the boiler, Figures 1—2.

B represents trunnion, Figs. 1—2.

C represents pipe connecting the boiler with reservoir, D, Figs. 1—2.

D represents reservoir, Figs. 1—2.

E represents escape pipe, Figs. 1—2.

F represents chamber for the reception of the water and in which the valve K discharges, Figs. 1—2.

H represents force pump plunger driven by the engine, Figs. 1—2.

G represents force pump, Figs. 1—2.

I represents weight or counterbalance, Figs. 1—2.

J represents dotted line showing height of water in the boiler, Figs. 1—2.

K represents escape valve in pipe E, Fig. 1.

L represents lever with weight attached, Fig. 1.

M represents projection in chamber F, Fig. 1.

N represents pipe connecting chamber F, and force pump G, Figs. 1—2.

O represents valves to supply fresh water to pump to make up the deficiency occasioned by the use of the steam, Figs. 1—2.

P represents check valve between pump and boiler A, Fig. 2.

R represents check valve between pump and chamber F, Fig. 1.

S represents bell to indicate by ringing or striking when the machine is in operation the height of water in the boiler, Fig. 1.

T represents stuffing box in chamber F, Figs. 1—2.

U represents long valve stem of valve K, Fig. 1.

W represents frame to support trunnion in its position on the boiler A, Figs. 1—2.

The nature of my invention consists in regulating and indicating the height of water in steam boilers, to regulate it by means of the reservoir D as a motive power and to indicate it by the ringing or striking of the bell.

To enable others skilled in the art to make and use my invention, I will proceed to describe the operation.

I perforate a hole in the boiler A at the water level. The trunnion as shown at B in the annexed drawings is fastened on in the common way or any of the known forms, so that the surplus water will pass through it into the pipe C before it will rise above the level of the dotted line J, in Fig. 2. Through C it passes to the reservoir D, in which it is detained until the overplus of weight of water over the counterbalance I causes the reservoir D to sink down, forcing the escape pipe E through the stuffing box T of chamber F and bringing the long stem U of valve K in contact with projection M in chamber F, thereby causing the valve K to open and allow the water in D to escape into F. From thence it flows to force pump G by means of pipe N, and is thrown back again into the boiler A. Should the water not rise above the dotted line J, the valve K would remain closed and the pump would be supplied by means of the valves O, O, connected with any ordinary supply of water in the usual manner.

S is a bell attached to counterbalance I. When the reservoir D sinks the counterbalance I will rise and in its movement cause the bell to vibrate and ring, indicating thereby that there is sufficient water in the boiler A.

What I claim is—

The arrangement of the reservoir D and weight I in relation to the boiler and the feed pump substantially as described whereby the weight of the excess water is used to regulate the supply by the pump, and to provide for its own return to the boiler.

AMOS JACOBS.

Witnesses:
NATHANIEL PRENTISS PARKER,
RICHARD PARKER.